(12) United States Patent
Green et al.

(10) Patent No.: US 7,117,230 B1
(45) Date of Patent: Oct. 3, 2006

(54) METHOD AND APPARATUS FOR FORMATTING AND INITIALIZATION OF RE-WRITABLE OPTICAL MEDIA USING MULTIPLE TRACKS

(75) Inventors: Mark A. Green, Berthoud, CO (US); Chris M. Bellman, Longmont, CO (US)

(73) Assignee: Sonic Solutions, Inc., Santa Clara, CA (US)

( * ) Notice: Subject to any disclaimer, the term of this patent is extended or adjusted under 35 U.S.C. 154(b) by 854 days.

(21) Appl. No.: 10/193,422

(22) Filed: Jul. 10, 2002

Related U.S. Application Data

(60) Provisional application No. 60/304,547, filed on Jul. 10, 2001.

(51) Int. Cl.
*G06F 12/00* (2006.01)
(52) U.S. Cl. ...................... 707/200; 707/102
(58) Field of Classification Search ............. 707/1, 707/100, 102, 104.1, 200, 204, 205; 710/1, 710/62, 72–74; 711/1, 4, 100, 101, 111, 711/112, 170, 173; 714/1–8, 100; 369/14, 369/53.11, 53.37, 59.1, 59.25, 272.1, 275.1–275.5
See application file for complete search history.

(56) References Cited

U.S. PATENT DOCUMENTS

| | | | |
|---|---|---|---|
| 5,537,578 A * | 7/1996 | Day et al. .................... 711/165 |
| 5,809,543 A * | 9/1998 | Byers et al. ................. 711/162 |
| 6,760,808 B1 * | 7/2004 | Peters et al. ................ 707/205 |
| 6,952,479 B1 * | 10/2005 | Shavit et al. ............... 713/193 |
| 6,983,292 B1 * | 1/2006 | Green et al. ................ 707/200 |

\* cited by examiner

*Primary Examiner*—Greta Robinson
*Assistant Examiner*—Harold E. Dodds, Jr.
(74) *Attorney, Agent, or Firm*—Martine Penilla & Gencarella, LLP

(57) ABSTRACT

A software-driven method for the initialization of re-writable optical media is provided. Embodiments include a software-driven method for the formatting of re-writable optical media to include defining a file system and writing a UDF reader to the optical media to enable implementation on a plurality of optical media devices in a plurality of operating system environments. The re-writable optical media is initialized using either user data or initialization patterns in a background operation to allow user interaction with the optical media during initialization. Methods are provided for multi-track capabilities of the optical media. Prior to initialization of the entire media space of an optical media, a session can be closed to enable compatibility of a partially initialized media in a ROM device. Further methods are provided to re-open a closed session to complete initialization of the media space.

19 Claims, 10 Drawing Sheets

METHOD AND APPARATUS FOR FORMATTING AND INITIALIZATION OF RE-WRITABLE OPTICAL MEDIA USING MULTIPLE TRACKS

CROSS REFERENCE TO RELATED APPLICATIONS

This application claims priority from U.S. Provisional Patent Application No. 60/304,547, filed Jul. 10, 2001, and entitled "METHOD AND APPARATUS FOR FORMATTING AND INITIALIZATION OF OPTICAL MEDIA." The disclosure of the provisional application is incorporated herein by reference. The present application is related to U.S. Pat. No. 6,983,292, entitled "METHOD AND APPARATUS FOR FORMATTING AND INITIALIZATION OF RE-WRITABLE OPTICAL MEDIA," and assigned to the same assignee as the present invention. U.S. Pat. No. 6,983,292 is incorporated herein by reference.

BACKGROUND OF THE INVENTION

1. Field of the Invention

The present invention relates generally to the recording of data onto optical media, and more particularly to a method for formatting and initializing re-writable optical media to provide user access to the media after only a short preparation time, and to provide for data integrity during the format and initialization operations, and during the life of the media.

2. Description of the Related Art

When recording data to optical media, a user typically provides a blank optical media for recording, selects a plurality of files from a source or plurality of sources, and executes a recording function. The selected files can be of any type including audio files, video files, photographic files, data files, program application files, and the like. The recording function is typically executed by use of an optical media recording program which accomplishes such tasks as mapping out precise locations of source files, determining size of source files, mapping out a precise target destination for the selected files, calculating a theoretical transfer rate for reading the file from a source and recording the file to a destination, identifying those files that will be cached and those files that will be recorded directly from source to destination, performing necessary file formatting as required, and burning the selected files to a destination optical media.

Before any of the above functions can occur, however, the target optical media must be properly formatted. Generally, formatting includes defining a file system and structure for writing data to a media, or for simple audio recording, defining a generic structure. Although different types of data require different types and levels of destination media formatting, the process of formatting re-writable optical media has failed to keep up with basic user demand for simple and efficient methods for rapidly formatting and initializing optical media.

Typically, a user must spend from 30 to 50 minutes in preparing re-writable optical media for recording data files. Assuming compliance with such standards as ISO9660 and Universal Disc Format (UDF™), preparation of re-writable optical media for recording data files requires at least writing to the entire disc, and then, for optimum preparation, verification by reading back each block. In the remaining document, reference to "UDF" shall be understood to be with reference to registered trademark UDF™. Verification of user data recorded to the media after formatting only occurs upon reading data back from the media. If a problem occurs but is not detected during the write process, the user's data is already lost by the time the problem is eventually discovered.

FIG. 1A shows a block diagram 10 of a typical formatted re-writable optical media according to the UDF standard. Block 20 is the Lead In area, block 22 is the UDF file system, and block 23 is an area of null data. Null data consists typically of 0's written to the disc specifically for the purpose of formatting. Block 24 represents the UDF area reserved for redundant file system information and possibly for sparing purposes, and block 26 represents the Lead Out area. The structures shown in block diagram 10 are well known, and represent a typical UDF formatted media. FIG. 1A is representative of a formatting structure that, in prior art, must be accomplished before data is recorded to re-writable optical media, and such formatting typically takes from 30 to 50 minutes to complete. Generally, no other processes or operations may be conducted with the optical media once the formatting has been initiated and until the formatting is complete.

One prior art solution to the amount of time that is required for media formatting has been the manufacture and sale of pre-formatted media. The pre-formatting, or formatting of the re-writable optical media prior to the sale or distribution to a user, continues to take the aforementioned 30–50 minutes, but is accomplished during the manufacture of the media. Pre-formatted re-writable optical media are simply formatted during manufacture, and the cost of formatting during production is passed on to the user. Further, a typical user is easily confused if not skilled enough to know, for example, that data is commonly recorded in UDF format, but audio is not. If a user desires to record audio files, then a UDF-formatted disc will indicate to the recording system that the media is "full". The recording system would then require that the media's pre-formatting be erased in preparation for audio recording.

Another prior art solution has been to utilize programming options described in the UDF specification. One such option is the "grow" format command defined in the MMC specification (SCSI-3 Multimedia Commands (MMC), published by the American National Standard of Accredited Standards Committee X3, Publication No. ANSI X3.304: 1997, and other similar or related documents). The "grow" format command is designed for use to incrementally format a partially formatted media, and provides a reasonably rapid method of saving of files to a formatted area. Once the formatted area of the media has been filled, however, the process slows down dramatically, if supported at all. Many currently available media recording devices do not support the method prescribed by the "grow" format command, which further requires a number of programming or implementation steps well beyond the level of skill of the typical user.

Yet another prior art method of reducing the time required for re-writable optical media formatting has been a hardware solution. The hardware solution implements a rapid format technique allowing a user to write to media in just a few minutes after initiation of the rapid formatting. The hardware solution generally utilizes the UDF format, and proceeds to incrementally initialize whole sections of media while allowing a user to write to those sections that have been initialized. While the total time to format optical media may remain approximately the same as described and known for other methods of media formatting, the hardware-implemented rapid formatting provides the ability to write to the media before the formatting of the entire disc has been completed. So long as the user leaves the optical media in the hardware device capable of the hardware rapid formatting, the user can write to those portions of formatted media, as they become available.

FIG. 1B shows a block diagram 15 of a typical prior art rapidly formatted re-writable media using a hardware-implemented rapid formatting process. Block 30 represents a Lead In area, and block 32 represents the UDF file system. The Lead In area and the UDF file system shown in blocks 30 and 32 are substantially identical to the Lead In area and UDF file system shown in blocks 20 and 22 of FIG. 1A. In FIG. 1B, the UDF file system shown in block 32 is followed by an uninitialized area represented by block 34. The uninitialized area 34 represents an area of the media between the Lead In 30 and the Lead Out 40 that has never been written to or otherwise formatted. The uninitialized area 34 will be formatted and written to in the process of the media formatting, but the initial structures shown in FIG. 1B allow the media to be accessed with a system incorporating the hardware implementing the rapid formatting.

The uninitialized area 34 is followed by an area of null data 36, the UDF redundant file system information and sparing region 38, and the Lead Out area 40. Because a section of the media remains uninitialized 34, the Lead In 30 lacks an accurate reference to point to an exact location for the Lead Out 40. The null data block 36 ensures that devices implementing a seek-calibration process as part of the spinning up of a disc have adequate formatted space in and near the Lead Out 40 for the seek calibration process. In substantially all other respects, the UDF redundant file system information and sparing region 38 and the Lead Out 40 are the same structures as those described in FIG. 1A at blocks 24 and 26.

As illustrated in FIG. 1B, the hardware-implemented rapid formatting creates a formatted re-writable media that looks and operates similar to the typical UDF formatted media. When the hardware-implemented method is initiated, the Lead In 30, UDF file system 32, a small amount of null data 36, the file system information and sparing region 38 and the Lead Out 40 are written and verified. Once these structures are established and verified, the media appears as a formatted media, and can be written to and verified as any other media might be. So long as the media remains in the hardware device capable of implementing the hardware-implemented formatting, the remainder of the uninitialized area 34 is formatted in whole sections, during which time a user can access and interact with those sections of the media that have been formatted. As each whole section of media space is written and verified, that section becomes available for use as a formatted section of media. The process of formatting sections of media continues and allows use of those sections of media that have been formatted while the formatting is proceeding. This is true only as long as the media remains in the device that initiated the formatting, or is inserted into another device capable of performing the hardware-implemented rapid formatting.

If the media is ejected from the formatting device prior to completion of the formatting of the entire media, it can be inserted into another device, but there are limitations on its use. If the other device into which the media is inserted is not capable of a hardware-implemented rapid formatting of media, the media can only be accessed in read-only mode. Essentially, the media presents itself as having a closed session of data written thereon, and therefore can be accessed for reading, but not for writing or completion of the formatting process.

Another limitation of the prior art formatting process is that although many formatting process applications utilize some form of defect management in the initial formatting of a media, there is no known prior art method of defect management of media during its useful life. By way of example, the UDF specification defines a sparing table to be used for re-writing data that was discovered to contain errors during the verification process, and the process of implementing the sparing table is known in the art. The UDF specification does not, however, define an area or process for defect management that includes periodic verification of data after its initial writing to the optical media.

In accordance with the above, what is needed is a method and system for the formatting and initialization of media which allows user access to media after only a short preparation time, allows full read and write capabilities during the initialization process, provides data integrity during the initialization and during the life of the media, allows a user to eject the media during the initialization and have the initialization continue upon media reinsertion, and uses an incremental initialization method to allow partially initialized media to be readable and writable by a plurality of systems and software applications.

SUMMARY OF THE INVENTION

Broadly speaking, the present invention fills these needs by providing a software-driven method and system for the initialization and formatting of re-writable optical media, and management of data integrity over the life of the re-writable optical media. The present invention can be implemented in numerous ways, including as a process, an apparatus, a system, a device, a method, or a computer readable media. Several embodiments of the present invention are described below.

In one embodiment, a software-driven method for formatting a re-writable optical media (RW media) is disclosed. The software-driven method includes receiving a request to format the RW media, and writing an ISO9660 image to the RW media. The ISO9660 image contains a UDF reader. Next, UDF structures and a write count table are written to the RW media. The write count table is configured to indicate a verification status of packets defined on the RW media. The method further includes writing additional media file system structures to the RW media, and verifying the ISO9660 image, the UDF structures, the write count table, and the additional media file system structures. The software-driven method then initializes a data partition, that is a series of blocks for user data, for the RW media. The initialization includes the writing and verifying of initialization packets to the data partition, and proceeds as a background process while the RW media is available for user interaction. The software-driven method enables interruption of the initializing. The interruption, at the user's request, includes closing a track and session on the RW media.

In another embodiment, a software-driven method for initializing a re-writable optical media (RW media) is disclosed. The software driven method includes code for formatting the RW media, and code for writing initialization packets to the RW media. The software driven method also includes code for verifying the initialization packets. The writing and verifying of initialization packets is processed as a background operation while allowing a user to interact with the RW media. The software driven method further includes code for interrupting the writing and verifying, and then for closing a track and session on the media. The closed session enables the RW media to be compatible for use in an optical media device requiring the closed session to interact with the RW media.

In still a further embodiment, a method for initialization of a multi-track re-writable optical media (RW media) is disclosed. The method provides for formatting the RW media, and for initializing the RW media. The initializing of the RW media includes writing and verifying a packet for user data to the RW media. The method further provides for closing a track and session on the RW media. After the session has been closed, the method includes opening the session, calculating a length of an alignment track, and writing the alignment track. The method then provides for opening a new fixed packet track on the RW media, and resuming the initializing of the RW media in the new fixed packet track.

The advantages of the present invention over other prior art solutions are numerous. One notable benefit and advantage of the invention is the savings in the cost to the user not having to purchase re-writable optical media preformatted with a UDF file system.

Another benefit is the savings in the time to the user not having to fully erase re-writable optical media (which could also take 30–50 minutes) purchased with a preformatted UDF file system should that user decide to use a piece of media for a purpose other than what the UDF file system is intended (such as audio).

An additional benefit is the savings in the cost to the user not having to purchase new hardware and new hardware specific media to perform the same tasks with the same benefits as that of the present invention, since the present invention utilizes currently existing hardware and media.

Yet another benefit is the ability to interchange partially formatted re-writable optical media allowing full read and write access with other UDF writable platforms. Additionally, embodiments of the present invention provide for compatibility with CD-ROM devices by closing a session on a partially formatted media, and further providing for re-opening a closed session when completion of initialization is desired.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIG. 4A is a block diagram illustrating Method 1 addressing of a fixed packet track on CD media.

FIG. 4B is a block diagram illustrating Method 2 addressing of a fixed packet track on CD media.

DETAILED DESCRIPTION OF THE PREFERRED EMBODIMENTS

Figure 1A:
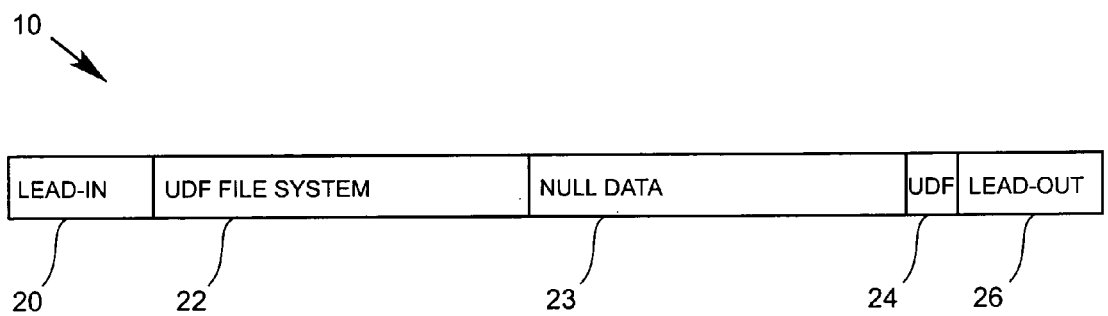
FIG. 1A shows a block diagram of a typical formatted media according to the UDF standard.
Figure 1B:
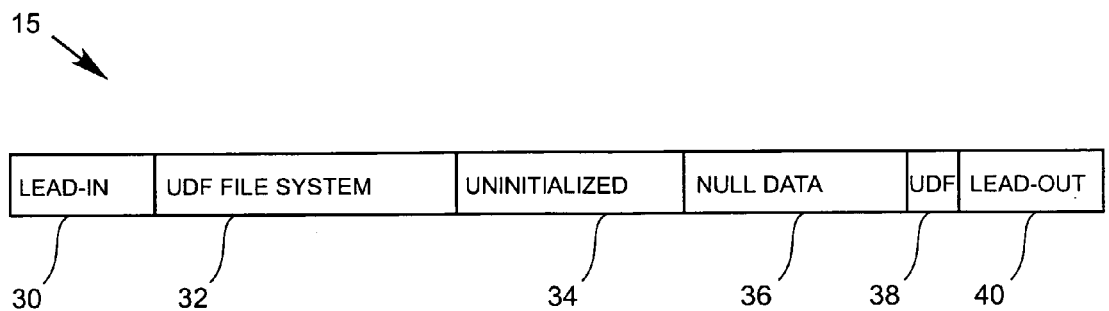
FIG. 1B shows a block diagram of a typical prior art rapidly formatted media using a hardware-implemented rapid formatting process.

An invention for software-driven initialization and verification of re-writable optical media while the user is interacting with it is disclosed. In preferred embodiments, the invention includes methods and media with features that allow user access to the media after only a short preparation time, that allow full read and write capabilities during the initialization process, and that provide optional multi-track capability for initialization and use. Additional features allow the user to eject the media during initialization and have initialization continue upon media reinsertion, and provide for use of an incremental initialization process to allow partially initialized media to be readable and writable by a plurality of media applications, devices and systems. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The present invention provides for the preparation of blank re-writable optical media, such as CD-RW, DVD-RW, DVD+RW, and the like, for use. The terms "media," "RW media," and "optical media," as used herein, shall be representative of all forms of re-writable optical media. Also as used herein, the term "formatting" describes the preparatory functions that program the file system structures required to define a file system on RW media, and the term "initialization" describes those processes that prepare the user data partition. In addition, the terms "track" and "session," as they apply to CD optical media and as used herein, also are equivalent to the concepts of "zone" and "border" as they apply to DVD optical media.

When a user begins the preparation of blank RW media, the media must first be formatted for use. In one embodiment, the formatting includes placing UDF structures on the media to define the media as a UDF disc. The UDF file system is the generally accepted file system for data files. As is known, UDF was developed by the Optical Storage Technology Association (OSTA) and is the standard for optical media such as CD, CD-R, CD-R/RW, CD-ROM, DVD-ROM, DVD-R/RW, DVD-RAM, DVD+R/+RW and the like to provide file use and interaction between optical media and a plurality of operating systems. A more detailed description of the UDF file system is found in the UDF specification, which is incorporated herein by reference.

In order to ensure compatibility and interoperability with a plurality of operating systems and software applications, a UDF reader is placed on the media during format, in one embodiment of the present invention. For those systems that do not incorporate a UDF implementation, the UDF reader provides the necessary access and compatibility for use of the media. In one embodiment, the UDF reader is provided in an ISO9660 image at the start of the media. As is known, ISO9660 is a file system specification for CD optical media defining such things as volume and file structures, and is a widely accepted standard for CD optical media. Use of a UDF reader provides user access to the UDF image on the media for those systems without a previously defined UDF implementation.

A feature of the present invention is the ability to use the media upon completion of the formatting process, and before completion of the initialization of the entire media. In one embodiment, the formatting takes only two to four minutes. Although the remainder of the initialization of the media will continue in the background until complete, interaction with the media is enabled as soon as the two to four minutes of formatting has been accomplished. In order to provide for the use of the media, including the ability to eject the media from the optical media drive, a number of UDF structures are written to the media during format so they are in place before the media can be ejected. In addition to the UDF reader described above, fixed packets containing UDF file system structures are written to the media. Examples of UDF file system structures include volume structures such as the Volume Recognition Sequence (VRS), Anchor Volume Descriptor Pointer (AVDP), Primary and Reserved Volume Descriptor Sequences (VDS), Logical Volume Integrity Descriptor (LVID), and the like, as well as the sparing table and pre-initialized space for sparing packets. Additional structures, such as the Partition Descriptor (PD) and the Unallocated Space Bitmap (USB), are provided with their content adjusted to identify only the area of the media partition that is formatted. Enough space is reserved, however, to contain a full sized USB once the media has completed initialization. Similarly, the Free Space Table and Size Table in the Logical Volume Integrity Descriptor (LVID) are adjusted to reflect the initial partition size. These structures are configured to identify the media to other UDF implementations, and to signify that the uninitialized area beyond the end of the partition should be ignored.

Following the writing of volume structures, the partition format is initiated. During the partition format, a number of packets are initialized, based on the size of the media, to provide the user some initial media space in which to work. In one embodiment, these packets are configured to contain structures including at least the USB, a File Set Descriptor (FSD), and the root directory for the partition.

In addition to structures defined in the UDF, additional structures are written during formatting to enable initialization after formatting while the user may be interacting with the media, as well as to provide for the initialization to be paused, the media to be ejected, and for the initialization to be resumed upon remount of the media. As will be described in greater detail below, the initialization can be resumed on generally any optical media recording device in an environment implementing the present invention.

In one embodiment, an additional structure is an inventive Write Count Table (WCT). The inventive WCT is configured to track the progress of the initialization and of the verification of the packets on the RW media. One embodiment of the inventive WCT includes several entries in the table, with each entry corresponding to one packet written to the RW media. By way of example, all uninitialized packets on the media are identified in an entry in the WCT of the decimal value 15. This value indicates that the corresponding packet is not initialized and will only become initialized when it is first written to. Once initialized, the WCT entries corresponding to each packet take on the role of Defect Management. A packet initialized for the first time will, upon being written, have its WCT entry set to, by way of example, the value 0. A WCT entry of 0 prompts the program to re-read the just written packet to verify the integrity of the data. After the packet has been read and verified, its corresponding WCT entry is reset to, by way of example, the decimal value 10. From this point, each time the packet is written to, its corresponding WCT entry is decremented by one. Once the value reaches 0, the packet is verified, and its corresponding WCT entry is reset to the decimal value 10 to repeat the process.

Once all of the structures of the formatting operation have been written to the optical media, the structures are verified. Verification is accomplished using the created structures and known verification techniques. The verification process for formatting is distinct from the verification performed during initialization, which is discussed in greater detail below. Once the verification of the formatting sectors is complete, the formatting of the optical media is complete and the optical media is prepared for the initialization process. In one embodiment, the formatting process just described takes two to four minutes.

Figure 2A:
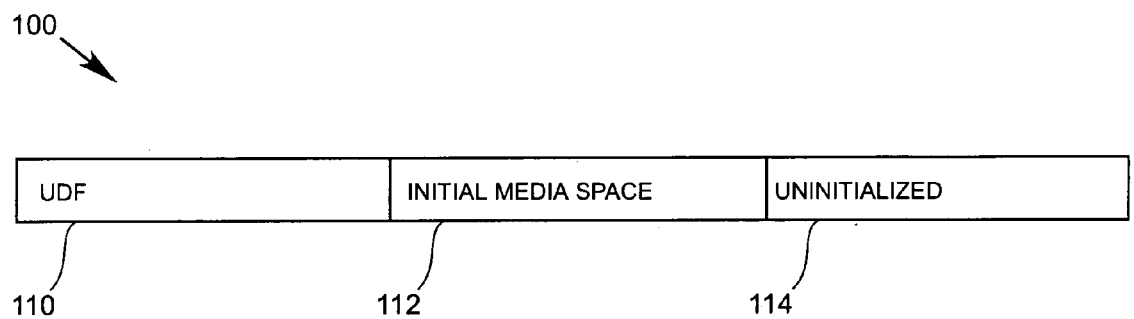
FIG. 2A shows a block diagram of the final state of a media after the formatting process in accordance with one embodiment of the invention.

FIG. 2A shows a block diagram 100 of the final state of a media after the formatting process in accordance with one embodiment of the invention. Block 110 contains the UDF and additional structures in a fixed packet area. Block 112 contains a number of packets, based on the size of the media, to provide the user some initial media space in which to work. Block 114 is the unwritten and uninitialized area of the media. In one embodiment of the present invention, blocks 110 and 112 are formatted during the initial preparation of the media for use.

Figure 2B:
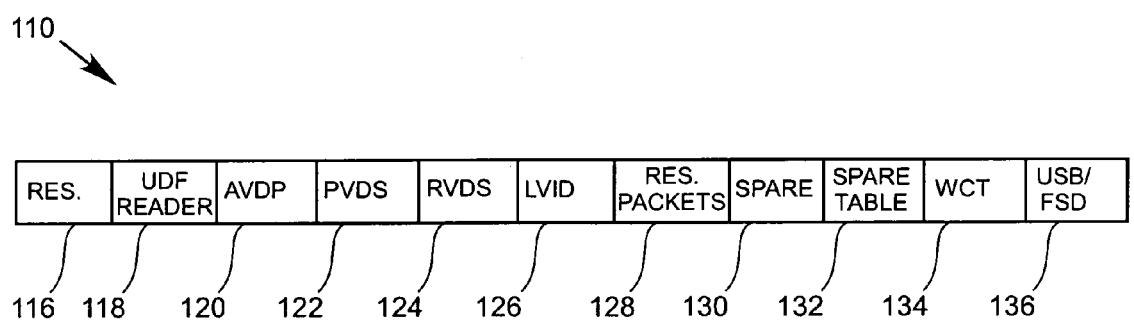
FIG. 2B shows a more detailed block diagram of the UDF and additional structures in the fixed packet area of block 110 shown in FIG. 2A in accordance with one embodiment of the invention.

FIG. 2B shows a more detailed block diagram of the UDF and additional structures in the fixed packet area of block 110 in accordance with one embodiment of the invention. Block 116 contains 16 sectors of reserved space. Block 118 contains an ISO9660 image containing a UDF reader. Blocks 120–132 contain UDF structures including an Anchor Volume Descriptor Pointer (AVDP) in block 120, a primary Volume Descriptor Sequence (VDS) in block 122, a reserve VDS in block 124, a Logical Volume Integrity Descriptor (LVID) in block 126, 32 reserved packets in block 128, 32 spare packets in block 130, and a spare table in block 132. The UDF structures are generally known structures, and are written to the fixed packet area 110 in accordance with UDF standards and functions.

Block 134 contains an inventive Write Count Table. The WCT, as described above, functions to keep track of the progress of the media initialization and verification. Block 136 contains an Unallocated Space Bitmap (USB), a File Set Descriptor (FSD), a root directory for the partition, and a Non-Allocatable Space list file.

As can be appreciated from FIGS. 2A and 2B, at the completion of the preparatory formatting, the media is not formatted as a closed session media in one embodiment of the invention. Referring to FIG. 1A, a closed session, initialized media contains a lead in area as shown in block 20 and a lead out area as shown in block 26. In one embodiment of the invention, the media can be ejected after completion of the formatting and, because the formatting includes writing a number of packets, based on the size of the media, to provide the user some initial media space in which to work as shown in block 112 of FIG. 2A, the media can be inserted into any RW device and a user can interact with that portion of the media initialized for use. If the system in which the media is inserted incorporates an embodiment of the present invention, initialization will continue as is described in greater detail below.

If, however, the partially initialized media is inserted into a CD-ROM device, and the media is not formatted as a closed session, the device will not see data on the media. As is known, an open session on media is not visible to a CD-ROM device, and therefore, in order to either read or interact with (including write to) the data that is written to the partially initialized media, it is necessary to use at least an RW device to see an open session. If the device is in a system implementing an embodiment of the present invention, then initialization will resume in the background while the user interacts with the media. If an embodiment of the present invention is not implemented in the system, the user is limited to interaction with those portions of the media that have been initialized, as the volume of the media that is visible and accessible is only that portion that has been initialized.

Once the format process is complete, a user can interact with the media including such operations as writing files, deleting files, moving files, creating and removing directories, and the like. While the user is interacting with the media, the present invention continues with the initialization as a background process.

In one embodiment of the invention, the user can interact with that portion of the media that is initialized (e.g., during the formatting procedure described above, and as packets are initialized during initialization as described in the following discussion), and packets in the uninitialized space are initialized in a background process. As packets are initialized, the USB is expanded (also described as the USB being "grown") to show the newly available space. As is known, a Partition Descriptor (PD) specifies the partition size on media. In one embodiment of the invention, the PD will specify a size for the partition that will include only the amount of space initialized in the partition during format. During continued initialization of the media, the PD is expanded to include the newly available space. Similarly, a Free Space Table and a Size Table in the LVID, block 126, are updated to reflect the larger size of the partition.

The PD, the Free Space Table, and the Size Table all reflect the initialized size of the media. If the media is mounted in a system that does not implement an embodiment of the present invention, the UDF structures provide for the use of those portions of the media that have been initialized. Inventive file system structures of the present invention, however, reflect the entire media space, both initialized and uninitialized portions. Therefore, a user implementing an embodiment of the present invention will have the entire media space indicated as available for use, and if using the media in a system that does not implement the present invention, will have those portions of the media that have been initialized reflected as available for both reading and writing. In one embodiment of the invention, the media is available for use on any system incorporating at least an RW device, whether or not the media is completely initialized, and whether or not the system implements the present invention.

During the continuing initialization of the media in one embodiment of the invention, interaction with the optical media may include writing to the media. If there is sufficient space already initialized to accommodate user data to be written, then the data is simply written directly to the media in initialized space. If, however, there is not yet available initialized space, then one embodiment of the invention includes the creating of space for the data. If there is enough remaining uninitialized space on the media, the present invention will use the user data as the initializing image for newly initialized packets. This process saves time in the initialization process, as the packets will not require the writing of a separate initialization pattern prior to being written with user data. The process of using user data implemented in an embodiment of the present invention is more thoroughly described in co-pending application Ser. No. 09/614,065 filed on Jul. 11, 2000 and assigned to the same assignee of the present application, and which is herein incorporated by reference. As the data is written, the USB, PD, and LVID are updated as described above, and the packet(s) marked for verification.

When user data is used for initialization, all packets containing user data and ready to be verified must be verified before the media can be ejected from the optical media recording device. The verification of packets containing user data prior to ejecting the media ensures the data is safely written to the media and accessible for use. If the media were to be ejected prior to verification, any data that contained errors would no longer be available, and may be forever lost.

One embodiment of the invention provides for safely ejecting media prior to the completion of the initialization process. In order to ensure user data is safely recorded to the media, all packets containing user data must be verified prior to ejecting the media from the optical media recording device. Once the media is ejected, the user data exists only on the optical media, and therefore the media must be verified to contain valid data before the media is ejected. Additionally, in order for the media to be usable on any other system implementing UDF, the UDF structures stored on the media must accurately reflect the amount of media space initialized.

After a command to eject the media is received, one embodiment of the present invention performs a number of operations to ensure data integrity and media configuration for system interoperability. A copy of the AVDP, block 120, is written in an address after the last written block of the session. It should be appreciated that the copy of the AVDP is written after, or outside of, the initialized partition space. Therefore, nine extra packets are written after the eject command to contain the copy of the AVDP and extra volume space. Additionally, the Unallocated Space Descriptor, which is stored in the Primary and Reserved VDS's, blocks 122 and 124, is updated to show the newly added volume space that contains the copy of the AVDP.

The USB, PD, and the Free Space and Size Tables of the LVID, are then updated and modified to reflect only the currently initialized image on the media. In this manner, the present invention provides for the interaction with the media by any other system incorporating a UDF implementation. Only those portions of the media that have been initialized are available for use and interaction on all systems. For those systems incorporating an embodiment of the present invention, additional structures are updated and modified to reflect the progress of initialization at the time the media is ejected to enable initialization to resume when the media is again mounted.

The inventive WCT, block 134, is updated to indicate initialized space. It should be noted that in one embodiment of the invention, the copy of the AVDP that is written after, or outside of, the initialized partition space is written to uninitialized space on the media. Once the media is again mounted in a system implementing an embodiment of the invention and initialization resumes, these packets will be initialized again as the first packets of uninitialized space. When the command to eject is received, the inventive WCT is updated and written to the media. Additionally, inventive structures known as Implementation Use Volume Descriptors (IUVD) are updated and written to the primary VDS and the reserve VDS (blocks 122 and 124). The IUVD contain various values used by the present invention, including the location and size of the inventive WCT.

In one embodiment of the invention, the user is queried whether or not to close the session on the media when a command to eject the media is received, and the media is not completely initialized. As described above, when initialization is halted prior to initialization of the entire media space, such as when the media is ejected, the initialized media space is accessible for interaction. In one embodiment, interaction requires an optical media device that is at least an RW device in order to access and interact with an open session on an optical media. If, however, interaction is desired or anticipated to be using, for example, a CD-ROM device, the UDF image on the media must be in a closed session. As is known, many optical media devices support multiple session media. A number of older devices, however, do not support multiple session media, and in one embodiment of the present invention, the user can select to either close a session or leave the session open based on a number of considerations including the device on which the optical media is intended to be used. By way of example, if a user desires to use the media in a read only manner in a CD-ROM device, the session would need to be closed, and therefore the UDF reader, block 118, would be contained in a closed session and visible to a CD-ROM device.

In accordance with known Close and Unclose Session commands and functions, assuming device support of such commands, the closing of a session takes additional time, and a realignment track will be required for the reopening of a closed session. Writing a realignment track consumes media space in addition to the required time for calculation and writing of the track. Further, as stated above, older systems and devices may not support multiple sessions. Therefore, an embodiment of the invention provides the user with the choice to either eject the media without closing the session, or to close the session prior to eject. Leaving the session open provides a faster eject and remount, and no loss of media space. The alternative option of closing the session prior to eject takes additional time and media space, but provides for use of the media in a CD-ROM device with the limitation that some older systems and devices do not support multiple sessions.

Once the media is ejected, whether or not the session remains open or is closed, the media is partially initialized and configured for use in a plurality of systems and devices. If the media is mounted in a system that does not implement the present invention, a user can interact with the optical media, including writing data to the media in the partially initialized space. A system not implementing the present invention will see the media as having only as much space as is initialized, and will be capable of reading from and writing to the initialized area provided.

If the media is mounted in another system implementing the present invention, or re-mounted in the same system that performed the formatting and partial initialization, then, in addition to having the initialized area available for interaction, one embodiment of the present invention provides for the entire media space, both initialized and uninitialized areas to be available for use, and provides for continuing the initialization until the entire media is initialized. Mounted in a system implementing an embodiment of the invention, inventive media structures reflect the entire media space including both initialized and uninitialized areas. The inventive media structures such as the inventive WCT and the IUVD are used to update the UDF structures, such as the USB to describe the entire media space instead of just the initialized media space.

If the media was previously ejected with an open session, then one embodiment of the invention provides for the resumption of the initialization after the verification that the control structures are valid. The initialization will begin in the space in which the nine packets containing the copy of the AVDP were written just after, or outside of, the initialized partition space. If, alternatively, the session was closed prior to ejecting the media, the system must open the session before background initialization can resume. In accordance with known techniques and procedures, and to maintain the packet alignment requirements as outlined in the OSTA UDF specification, the opening of a session requires the writing of a realignment track, consuming both time and media space. Additionally, the inventive media structures and the UDF structures must be updated to reflect the changes caused by realignment. Only after these actions are accomplished can the initialization of the media resume. The process for opening a previously closed session and resuming initialization of the media is described in more detail below in reference to FIGS. 4A, 4B, 5, and 6

In some circumstances, a re-mounted media may be discovered to have damaged, missing or corrupted inventive file system structures upon re-mount. The present invention provides for the reconstruction of necessary file system structures. One embodiment of the present invention may create and replace missing or corrupt file system structures as needed. Any file system structure requiring repair or replacement is set for immediate verification, and then background initialization is resumed.

A media mounted in a system implementing an embodiment of the present invention initializes the media as a background operation until the media is completely initialized. Once the media is completely initialized, the UDF structures are updated and written, and the inventive file system structures of the present invention are updated and written. In one embodiment, the track and session on the media is not closed until just prior to ejecting the media from the optical media recording device. In accordance with known practices and techniques, a number of structures are written to close a track and session. By way of example, the Lead Out area shown in block 26 of FIG. 1A is an exemplary structure that is written to close a session. Because it takes an additional amount of time to write the final structures to close a session, one embodiment of the invention postpones the operation until just prior to ejecting the media. The user is advised of the additional time required to close the track and session, and the present invention proceeds to write the structures and close the track and session.

If a system is powered down prior to media eject, one embodiment of the invention will not close the track and session in the absence of feedback from the user. If a user is not aware of the additional time needed to close the track and session, power might be prematurely secured from the system, and if the track and session were in the process of being closed, the media may become corrupted. Instead, the present invention provides for finalizing the structures of the media to reflect the initialized media space, and the track and session would be closed when the system is next rebooted and the media ejected.

Figure 3A:
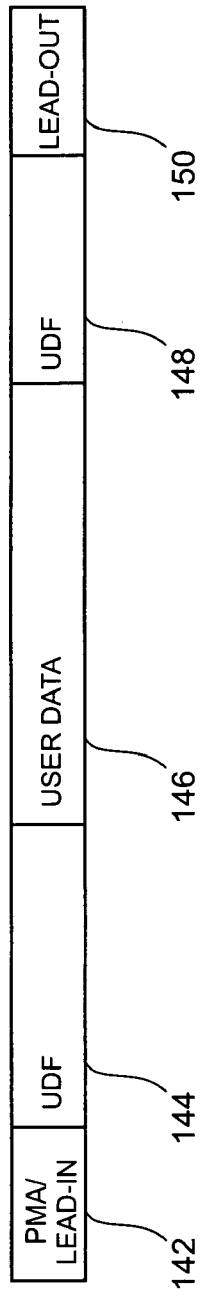
FIG. 3A shows a block diagram of an exemplary initialized media after the initialization process is complete in accordance with one embodiment of the invention.

Once the media has been completely initialized, it appears as a closed session, initialized media. FIG. 3A shows a block diagram 140 of an exemplary initialized media after the initialization process is complete in accordance with one embodiment of the invention. Block 142 contains the Program Memory Area (PMA) and session Lead-In. Block 144 contains the UDF and other inventive file system structures. The initialized partition space and user data spans the largest block of media in block 146. Block 146 contains both packets of user data and packets of initialized media space that have been initialized, verified and are ready for user data to be written. The final UDF structures, in accordance with the UDF specification, are written to block 148 and the session Lead Out is written to block 150.

Figure 3B:
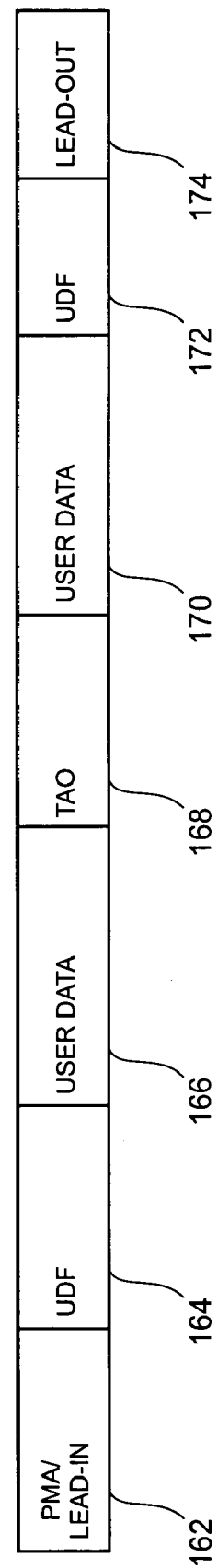
FIG. 3B shows a block diagram of an initialized media that had one eject and user-selected close session during initialization in accordance with another embodiment of the invention.

FIG. 3B shows a block diagram 160 of an initialized media that had one eject and user-selected close session during initialization in accordance with another embodiment of the invention. As described in greater detail above, the re-opening of a closed session requires an inventive track realignment operation. In FIG. 3B, the first two blocks mirror the first two blocks shown in FIG. 3A. A PMA and Session Lead In are contained in block 162, and the UDF and other inventive file system structures are contained in block 164. Block 166 represents the first block of initialized partition space and user data. Block 166 represents that the first block of initialized partition space and user data are only as large as the amount of initialization that was able to be accomplished before a command to eject was received. After the session was closed and the media ejected, and the media was once again mounted in a system implementing an embodiment of the present invention enabling the initialization to resume and conclude, the session was opened and a track-at-once (TAO) alignment track, to realign the packet boundaries to a multiple of the packet size in accordance with the UDF specification, was written as shown in block 168. Following block 168 is the continued initialized partition space and user data in block 170. Blocks 172 and 174 complete the media with the final UDF structures and the session Lead Out, respectively.

FIGS. 3A and 3B illustrate that media formatted and initialized in accordance with embodiments of the present invention result in media that is formatted and initialized in accordance with the UDF specification. The present invention, however, provides for essentially immediate interaction with the media following the two to four minute formatting process, and continuing initialization of the media as a background operation until initialization is complete. As described above, once the two to four minute formatting procedure is completed, initialization proceeds in the background until complete or until the process is interrupted by, for example, a command to eject the media. If an eject command is issued, one embodiment of the invention prompts a user to select whether or not to close the track and session. If a user elects to close the session, embodiments of the present invention provide for writing the necessary structures to close the session, and then to re-open the session when desired.

In one embodiment of the invention, media having a session that was closed upon eject cannot be further initialized until the session is opened again and an inventive TAO alignment track 168 written. As described above, the process of re-opening a closed session, if supported, takes both time and media space. When it is determined that reopening a closed session is necessary, the lead-out block that was written to close the session is erased, and then a TAO alignment track 168 is written. In accordance with the UDF specification, packets in the UDF partition must be aligned so that each packet begins on a logical block address that is an integral multiple of the packet size. In one embodiment of the invention, the packet size is 32. Additionally, upon closing a fixed packet track, Method 2 logical block addressing will end and the device will return to Method 1 logical block addressing.

The size of the TAO alignment track 168 is dependent upon the number of TAO alignment tracks 168 previously written to the optical media, as well the location of the TAO alignment track 168 on the media, any minimum lengths for a TAO alignment track defined for the media, and other such factors. As will be described in greater detail below, the size of the inventive TAO alignment track 168 is calculated, the TAO alignment track 168 is written, and inventive structures such as the IUVD, the WCT, the USB, PD, and Free Space and Size Tables are updated to identify the address and length of the TAO alignment track 168. Additionally, UDF structures such as the UDF Non-Allocateable Space list must be updated to prevent other implementations from attempting to access the TAO alignment track 168.

Generally, writable CD media is addressed according to at least two schemes. A physical address of a given block on the media is the address assigned based on the physical construction of the media. In the physical space, every block is visible and has a sequential address. A logical address of a given block on the media is a number assigned to the block by the optical media device, and used by the host system to reference the block.

Figures 4A, 4B:
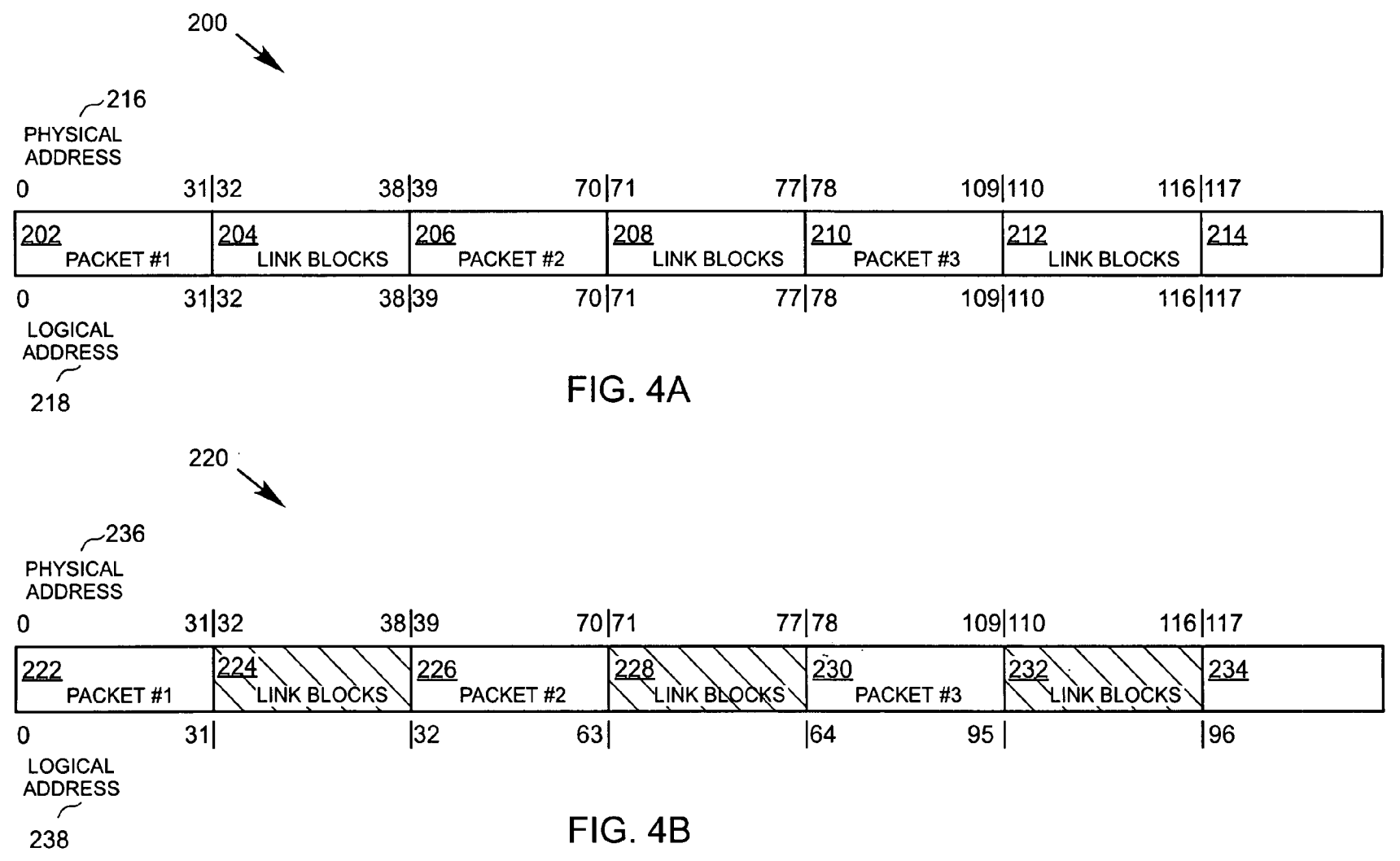

In accordance with accepted standards for writable CD optical media, optical media recording devices use Method 1 and Method 2 addressing of logical addresses of writable CD media. FIGS. 4A and 4B illustrate the two addressing methods.

FIG. 4A is a block diagram 200 illustrating Method 1 addressing of a track on CD media. As is known, packet writing to an optical media consists of writing packets of data of either a fixed or variable size, the size being pre-determined, and link blocks, also of a pre-determined size, written between two packets of user data. In the illustrated example, packets of a fixed length of thirty-two blocks are written to the optical media, and link blocks consisting of seven blocks are written between each 32-block packet of user data. As described above, a physical address of a given block on the media is the address assigned based on the physical construction of the media, and every block is visible and has a sequential address. In Method 1 addressing, all blocks in the user accessible area of the media are visible in the address space, and therefore the physical address and the logical address are apparently the same address. Turning to FIG. 4A, the physical address 216 of identified blocks is listed across the top of the block diagram 200, and the logical address 218 of identified blocks is listed across the bottom of the block diagram 200. Packet #1, 202, begins with block 0 and ends with block 31, link blocks 204 begin with block 32 and end with block 38, packet #2, 206, begins with block 39 and ends with block 70, link blocks 208 begin with block 71 and end with block 77, packet #3, 210, begins with block 78 and ends with block 109, and link blocks 212 begin with block 110 and end with block 116. Media space 214 beginning with block 117 represents the continuation of the pattern for the remainder of the media space.

FIG. 4B is a block diagram 220 illustrating Method 2 addressing of a track on CD media. In contrast to the Method 1 addressing illustrated in FIG. 4A, FIG. 4B shows the same data and link blocks with Method 2 addressing. Method 2 addressing provides for the host to see only the user data as a sequential series of blocks by mapping out the link blocks. This is shown in FIG. 4B where again the physical address 236 of identified blocks is listed across the top of the block diagram 250, and the logical address 238 of identified blocks is listed across the bottom of the block diagram 250. The physical addresses in FIG. 4B are identical to those in FIG. 4A with Packet #1, 222, beginning with block 0 and ending with block 31, link blocks 224 beginning with block 32 and ending with block 38, packet #2, 226, beginning with block 39 and ending with block 70, link blocs 228 beginning with block 71 and ending with block 77, packet #3, 230, beginning with block 78 and ending with block 109, and link blocks 232 beginning with block 110 and ending with block 119. Media space 234 beginning with block 117 represents the continuation of the pattern for the remainder of the media space.

The logical address 238 as identified across the bottom of block diagram 220 shows the difference between Method 2 and Method 1 addressing. Packet #1, 222, begins with block 0 and ends with block 31, but the link blocks 224 are mapped out of the Method 2 addressing, and therefore Packet #2, 226, begins with block 32 and ends with block 63. Link blocks 228 are likewise mapped out of the Method 2 addressing, and Packet #3, 230, begins with block 64 and ends with block 95. As is known, Method 2 addressing is used in fixed packet mode with the periodicity of the link blocks enabling the device mapping to ignore link blocs to present the logical addressing of user data as a contiguous stream of blocks with no link blocks.

In one embodiment of the present invention, the user accessible areas of the data partition of an optical media are written in fixed packet tracks, and therefore represented with Method 2 addressing by the optical media device. If an optical media is ejected prior to the completion of initialization, and close session is selected, the fixed packet track is closed. When the media is re-mounted, and initialization is to resume, a TAO alignment track is written to ensure the start of a next fixed packet track is at a logical block address that is an integral multiple of the packet size, which in one embodiment is 32 blocks. However, because the first fixed packet track was closed, the optical media device returned to Method 1 addressing when writing the TAO alignment track. To ensure the Method 1 addressing matches the physical address as shown in FIG. 4A, the blocks mapped out of the first fixed packet track using Method 2 addressing are added back into the logical address beginning with the TAO alignment track.

Figure 5:
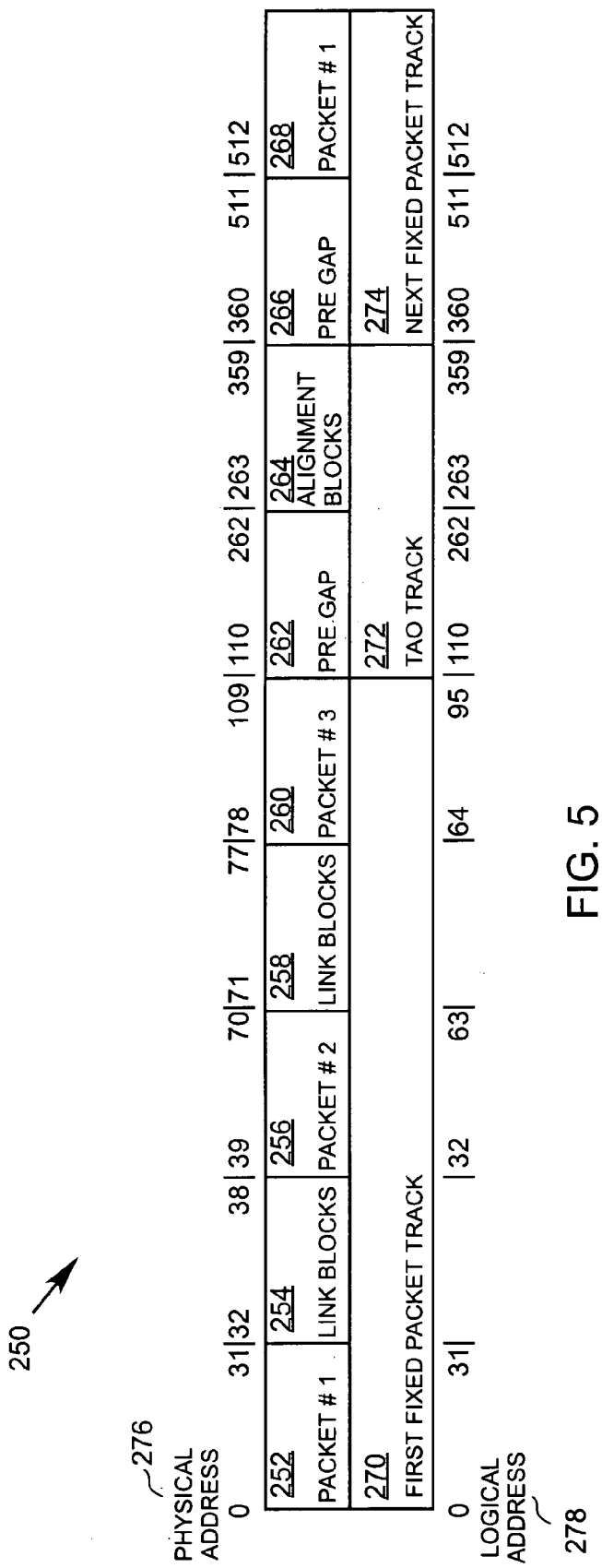
FIG. 5 is a block diagram illustrating the addressing of media space and use of the alignment track in multi-track media in accordance with one embodiment of the present invention.

FIG. 5 is a block diagram 250 illustrating the addressing of media space in multi-track media in accordance with one embodiment of the present invention. Physical addresses 276 for identified blocks are listed across the top of the block diagram 250, and logical addresses 278 for identified blocks are listed across the bottom of the block diagram 250. FIG. 5 is exemplary only, and for simplicity in illustration and discussion, minimum track lengths have been ignored. As is known, at least three hundred user data blocks are required in every track, but FIG. 5 ignores these, and other, requirements for ease of illustration and description, and therefore physical and logical addresses do not generally correspond to actual media addresses.

User data in the first fixed packet track 270 includes packet #1, 252, packet #2, 256, and packet #3, 260, separated by link blocks 254 and 258. The TAO alignment track 272 includes a pregap 262 and alignment blocks 264. A next fixed packet track 274 includes a pregap 266 and packet #1 268. As already illustrated and described, the physical addresses 276 identify the sequential physical space on the media. The logical addresses 278 identify only the user data space in the first fixed packet track 270 which uses Method 2 addressing and maps out the link blocks. In the TAO alignment track 272, the addressing is Method 1, and so the logical address 278 tracks the physical address 276. In the next fixed packet track 274, the addressing is once again Method 2. As is known, although a pregap 266 is not user data, it is a multi-track structure that is not mapped out of Method 2 addressing.

It should be noted from FIG. 5 that the last block of first fixed packet track 270 is at a logical address of 95, and the first block of the TAO alignment track 272 is at a logical address of 110, even though the two blocks are sequential blocks. As described above, when the first fixed packet track 270 is closed, the addressing switches to Method 1 addressing. In order to establish the tracking between the physical and logical addresses, the number of blocks that were mapped out of the Method 2 addressed space are added back into the initial Method 1 logical address. In FIG. 5, two 7-block link blocks 254, 258, were mapped out of the logical addresses in the first fixed packet track 270. The 14 blocks are added back into the first block of Method 1 addressing at the beginning of the TAO alignment track 272, resulting in the apparent discontinuity of addressing. In one embodiment of the invention, the number of blocks mapped out during Method 2 addressing are included in the calculation of the size of the TAO alignment track 272.

As described above in reference to FIGS. 3A and 3B, a TAO alignment track 272 is written to ensure packets in the UDF partition are aligned so that each packet begins on a logical block address that is an integral multiple of the packet size. Since addressing switches to Method 1 addressing upon closing of the first, or any subsequent, fixed packet track, the logical address is adjusted to match the physical address, and in one embodiment, this adjustment is included in the calculation to determine the size of the TAO which is written in Method 1 mode after the close of the fixed packet track.

The size, or length, of the TAO alignment track is therefore calculated using the number of any reappearing link blocks, the length of pregaps preceding the TAO and the first packet of the next fixed packet track, and a TAO length to ensure the fixed packets of the next fixed packet track begin at a logical block address that is an integral multiple of the packet size. In one embodiment, the equation to determine a length for the TAO is:

$$nL_{Pkt} = L_{TAO} + 2L_{Gap} + S_{TAOGap} \qquad \text{Equation 1}$$

In equation 1, $nL_{Pkt}$ is an integer number, n, times the length of a packet, $L_{pkt}$ which, in one embodiment, is 32 blocks. $L_{TAO}$ is the length of the TAO alignment track, $L_{Gap}$ is the length of a pregap, and $S_{TAOGap}$ is the start address of the pregap for the TAO alignment track. All of the information for the variables to solve for $L_{TAO}$ is available using known device commands such as ReadTrackInfo, or promulgated in the standard specifications for writable CD media, such as a minimum track length for a TAO of 300 blocks. In one embodiment, the length of the TAO alignment track will be between 300 and 331 blocks.

It is further noted that when switching between Method 1 and Method 2 addressing, any media space calculations should account for the addressing discontinuity. In one embodiment, the media capacity calculation, which is a factor in the background initialization process, remaining space calculations, and the like, is one example of a media space calculation where these conversions must be considered. In typical calculations, the capacity, or total number of blocks on a media, is equal to the total length in blocks of the last track added to the start address of the last track. If Method 2 addressing is used, this calculation requires adjustment. According to optical media standards and specifications, the start address of any given track on the media is always given in Method 1 addressing, and therefore only the track length calculation will require adjustment for Method 2.

In one embodiment of the present invention, the capacity of the media relative to Method 2 addressing is calculated according to the following equation:

$$C_{M2}=S_n+[L_n/(L_{Pkt}+L_{Lnk})]L_{Pkt} \qquad \text{Equation 2}$$

Figure 6:
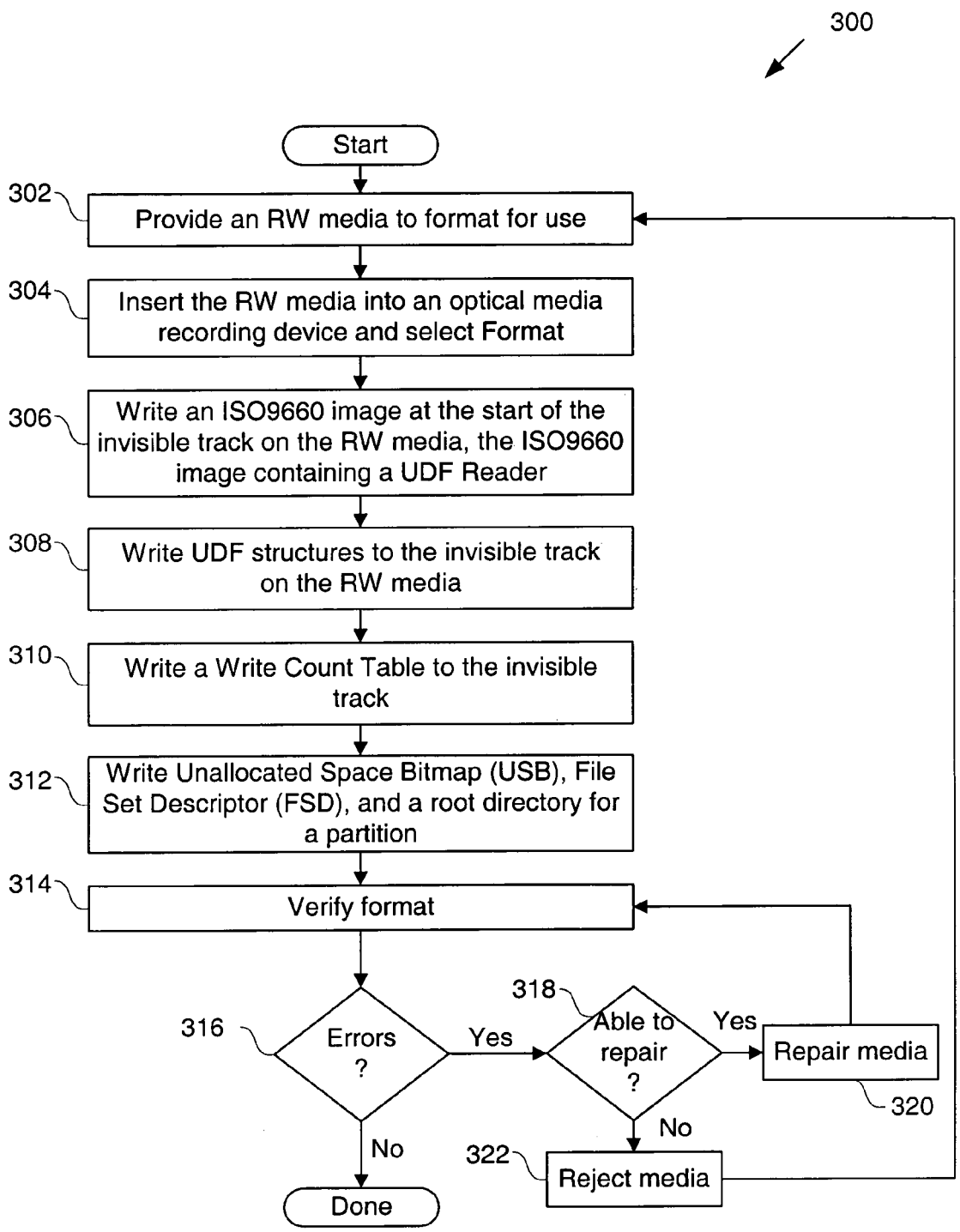
FIG. 6 shows a flow chart diagram illustrating the method operations performed in the formatting of RW media in accordance with one embodiment of the invention.

In equation 2, $C_{M2}$ is the capacity of the optical media relative to Method 2 addressing, $S_n$ is the start address of track n, the last track on the optical media, $L_n$ is the length of track n, $L_{Pkt}$ is the length of a fixed packet in the fixed packet track, and $L_{Lnk}$ is the length of a set of link blocks, The expression, $[L_n/(L_{Pkt}+L_{Lnk})]$, is rounded down to the next integer, FIGS, 6–10 illustrate the implementation of several features of the present invention in accordance with a plurality of embodiments, It should be appreciated from the following discussion that a feature of the present invention is that it is a software driven or implemented method, While typical prerequisite device communication and compatibility are necessary components of implementation, the structures and functions described above, and the methods described in the following discussion, are essentially implemented in software, Embodiments of the present invention can be implemented in a plurality of operating systems in communication with a plurality of optical media recording devices, and embodiments of the present invention are portable across operating systems and optical media recording devices with optical media that is partially or fully initialized, FIG. 6 shows a flow chart diagram 300 illustrating the method operations performed in the formatting of RW media in accordance with one embodiment of the invention. The method begins with operation 302 in which an RW media is provided to format for use. In one embodiment, a computer system is booted and operating, and an optical media recording program in accordance with the present invention is running.

The method proceeds with operation 304 in which the RW media is inserted into an optical media drive configured for recording optical media, and a user selects a Format command to format the RW media. In one embodiment, a user may select Format prior to the inserting of a target media, and the program prompts to insert a blank RW media to be formatted. Once an RW media has been inserted and the Format command is executed, the method advances to operation 306.

In operation 306, the formatting of the RW media begins with the writing of an ISO9660 image that contains a UDF reader to the RW media. As described above in reference to FIGS. 2A and 2B, one embodiment of the invention reserves the first 16 blocks of media, and then writes the UDF reader beginning with the next block.

It is hereby noted that method operations 306, 308, and 310 in flow chart diagram 300 describe writing to an invisible track on the RW media. The term "invisible track" is known in the art, and is herein used in its familiar packet-writing sense to describe the space on RW media in which structures and information are written in packets. The invisible track is outside of the bounds of any given track in the open area past the last closed track, if one should exist, on the RW media. The invisible track is sometimes referred to as an open track, and remains so open until all of the packets that are to be written to any given track are written, and the track is closed. Upon closing of a track, a new invisible track is implicitly created since, by definition, the invisible track is outside the bounds of any given track, and in the open area past the last closed track.

Returning to FIG. 6, the method proceeds with operation 308 in which UDF structures are written to the RW media. The UDF structures include an AVDP, a primary and reserve VDS, an LVID, 32 reserved blocks, 32 blocks for spares, and the spare table. These UDF structures are illustrated as items 118–132 in FIG. 2B.

An inventive Write Count Table (WCT) is next written to the track in operation 310. After writing the volume structures, the user partition is next formatted. During format, a number of packets are initialized, based on the size of the media, to provide the user with some initialized space to work with. The USB, FSD, and a root directory for a partition are written in these packets in operation 312. These packets are also collectively referred to as media file system structures.

The method next verifies the formatting in operation 314. The verification is accomplished using the structures written to the media in the preceding operations to ensure the file system is correctly defined on the media so that initialization can proceed. The method advances to decision block 316 in which it is determined whether the verification identified any errors. If there are no errors, the method is done. If errors are identified, the method advances to decision block 318 in which it is determined whether the identified errors can be repaired.

If the errors can be repaired, the method advances to operation 330 in which the errors are repaired. Once the errors have been repaired, the method loops back to operation 314 and once again verifies the formatting. If the formatting is then verified and no additional errors are identified, a "no" to decision block 316, the method is done. If additional errors are discovered, the method repeats the loop of determining whether or not the errors can be repaired, repairing the media, and verifying the format until the formatting is verified and error-free.

If, in decision block 318, the method determines the errors cannot be repaired, the method advances to operation 322 and rejects the media. One example of an error that cannot be repaired is if the AVDP cannot be verified. The UDF specification requires that the AVDP be at a fixed location on the media. If the AVDP cannot be verified in that location, it is not permissible to move it elsewhere, so the media must be discarded. In one embodiment, the program advises the user of the error and prompts the user to eject the media. The method then loops back to operation 302 in which a blank RW media is provided for formatting and the method is repeated.

Figure 7:
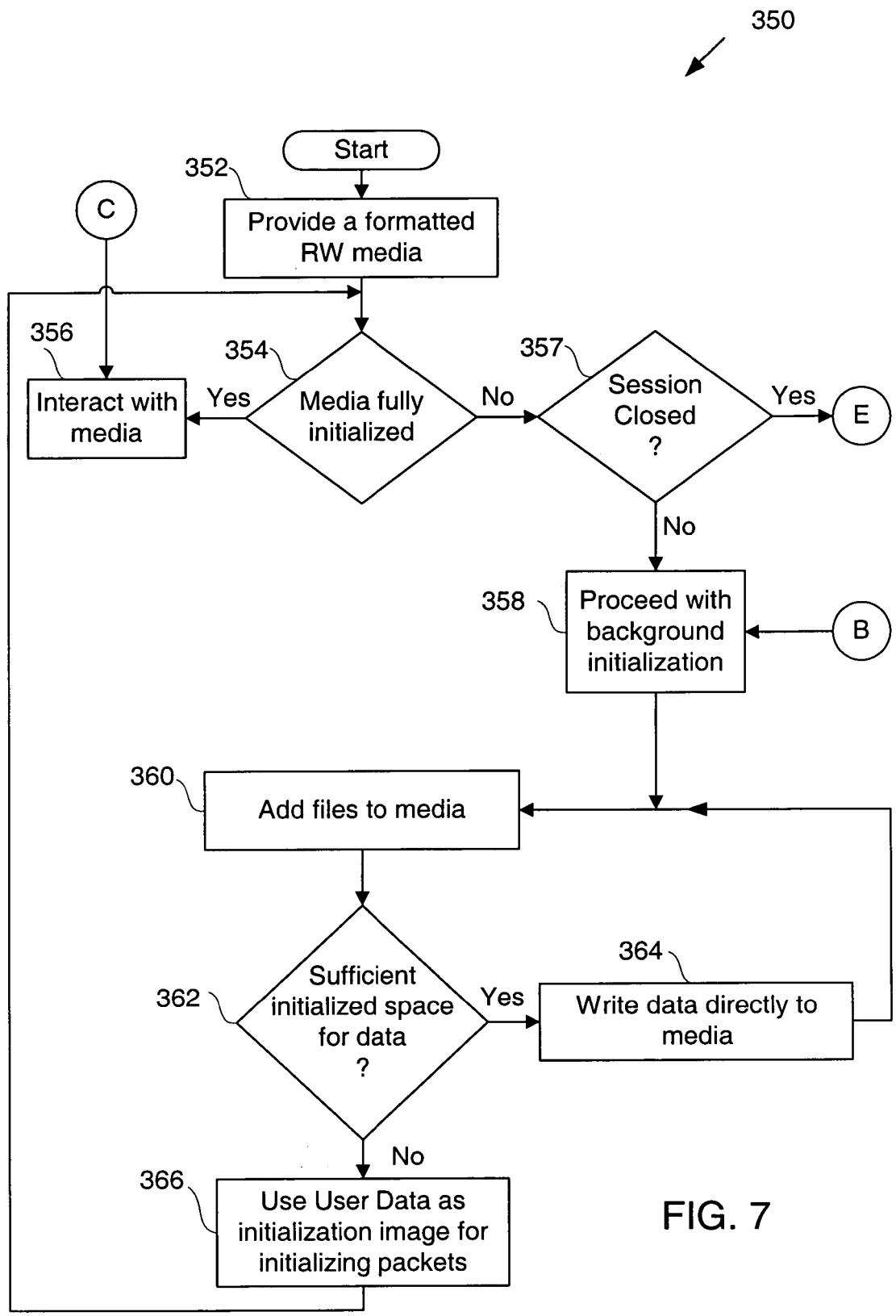
FIG. 7 shows a flow chart diagram illustrating the method operations performed in the general interaction with and background initialization of an RW media in accordance with one embodiment of the invention.

FIG. 7 shows a flow chart diagram 350 illustrating the method operations performed in the general interaction with and background initialization of an RW media in accordance with one embodiment of the invention. The method begins with operation 352 in which a formatted optical media is provided. The formatted media can be a partially or fully initialized media, or it can be a media that has only the formatting as described in flow chart diagram 300 of FIG. 6. Once the media is provided in operation 352, the method advances to decision block 354 and determines whether or not the media is fully initialized.

If the media is fully initialized, a "yes" to decision block 354, the method advances to operation 356 in which a user simply interacts with the media. The interaction can include writing files, reading files, executing programs, generating or extracting data, creating or moving files and directories, deleting files and directories, and the like.

If the media is not fully initialized, a "no" to decision block 354, the method advances to decision block 357 to determine whether the session on the media is closed. In one embodiment of the invention, a user is provided the option to close the session on a partially initialized media. If media use is desired, for example, on a CD-ROM device, a closed session is necessary. In decision block 357, it is determined whether the session on the media is closed. If the session is closed, a "yes" to decision block 357, the method advances through connector "E" to flow chart diagram 375 shown in FIG. 8.

Figure 8:
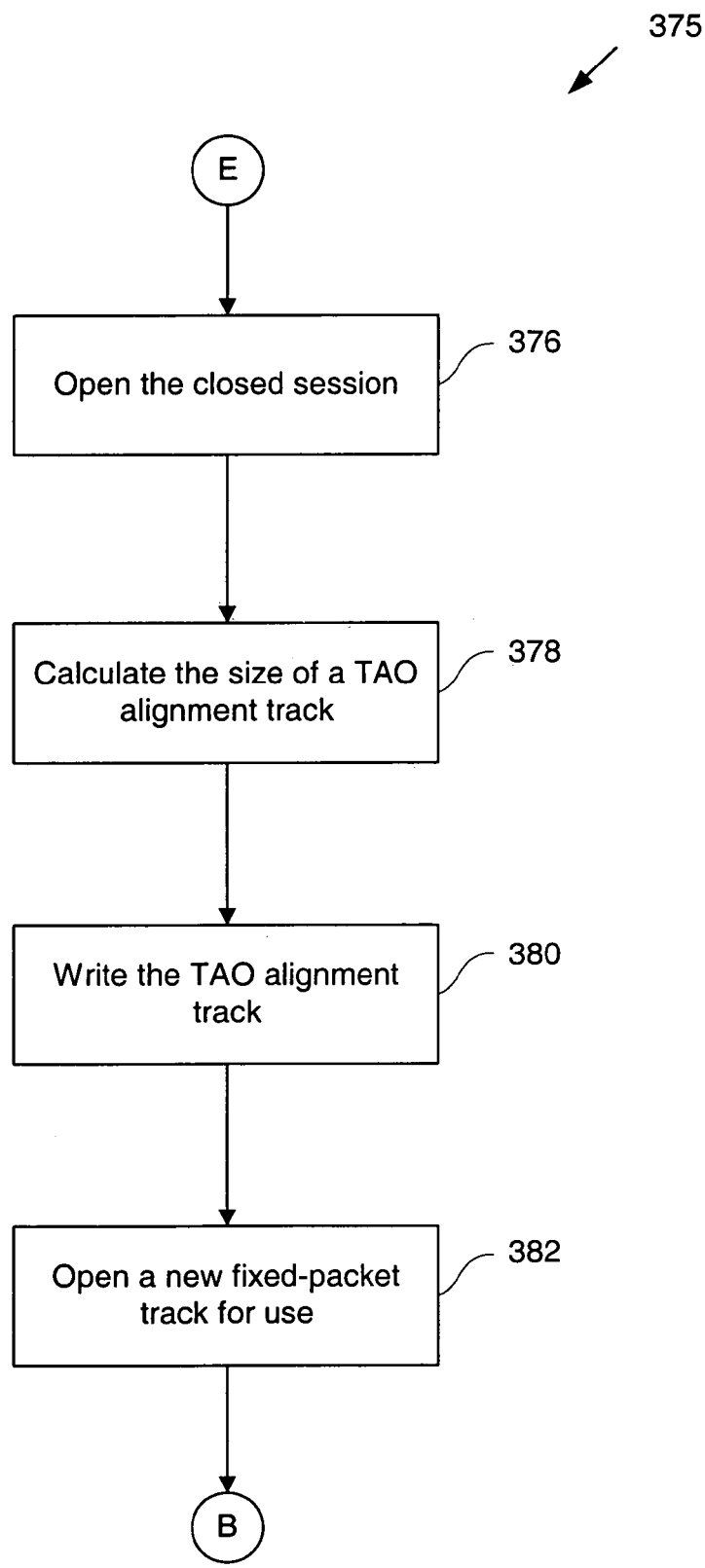
FIG. 8 is a flow chart diagram illustrating the method operations of opening a previously closed session on a partially initialized media in accordance with one embodiment of the present invention.

FIG. 8 is a flow chart diagram 375 illustrating the method operations of opening a previously closed session on a partially initialized media in accordance with one embodiment of the present invention. The method proceeds through connector "E" to operation 376 in which the closed session is opened. In one embodiment, the Unclose Session command, if supported by the media device, is used to open a previously closed session.

Once the previously closed session has been opened, the method continues with operation 378 in which the size of the TAO alignment track is calculated. As described above in reference to FIG. 5 and Equation 1, the length of the TAO track is calculated using the number of any reappearing link blocks and the length of pregaps preceding the TAO and the first packet of the next fixed packet track to ensure the fixed packets of the next fixed packet track begin at a logical block address that is an integral multiple of the packet size. In one embodiment, the calculation is provided as Equation 1.

Once the size of the TAO alignment track is calculated, the method proceeds to operation 380 in which the TAO alignment track is written. The method then continues with operation 382 in which a new fixed packet track is open for use. The method then proceeds through connector "B" back to flow chart 350 in FIG. 7.

Returning to FIG. 7, the method continues with operation 358 in which the initialization of the media is performed as a background process. A user can interact with the media by reading, writing, executing, and the like while the present invention, in the background, initializes the media by writing initialization packets and then verifying the packets until the media space is initialized.

As the initialization of the media continues as a background operation, the method advances to operation 360, in one embodiment, in which a user adds files to the media. The method continues with decision block 362 where it is determined if there is sufficient initialized space on the media for the data that is to be added. If there is enough initialized space, a "yes" to decision block 362, the method advances to operation 364 in which the data is written directly to the optical media to user data space in initialized packets. The background initialization continues, and the method provides for the user to continue to write files to the media as the method loops back to operation 360 and more files are added to the media.

If files are added to the media, and there is not sufficient initialized space, a "no" to decision block 362, the method advances to operation 366 to use the user data for the initializing image. The method arrives at operation 366 with background initializing continuing, and will therefore first attempt to use the user data as the initialization image in operation 366 to both write the user data to the media and to use the user data to initialize the media. In using user data for initialization, one embodiment of the present invention determines the available space, both initialized and uninitialized space on the media and will write the user data as the initializing image only if sufficient space exists on the media. As in general interaction with media, if there is not sufficient space for selected data, one embodiment of the present invention prompts the user that there is insufficient space and, in one embodiment, prompts the user to select data for which there is sufficient space, or to provide another media for the selected data.

Once the user data is used as the initialization image in operation 366, the method loops back to decision block 354 to determine whether the media is fully initialized. The method then continues with general user interaction, or with general user interaction while proceeding with background initialization as described above.

Figure 9:
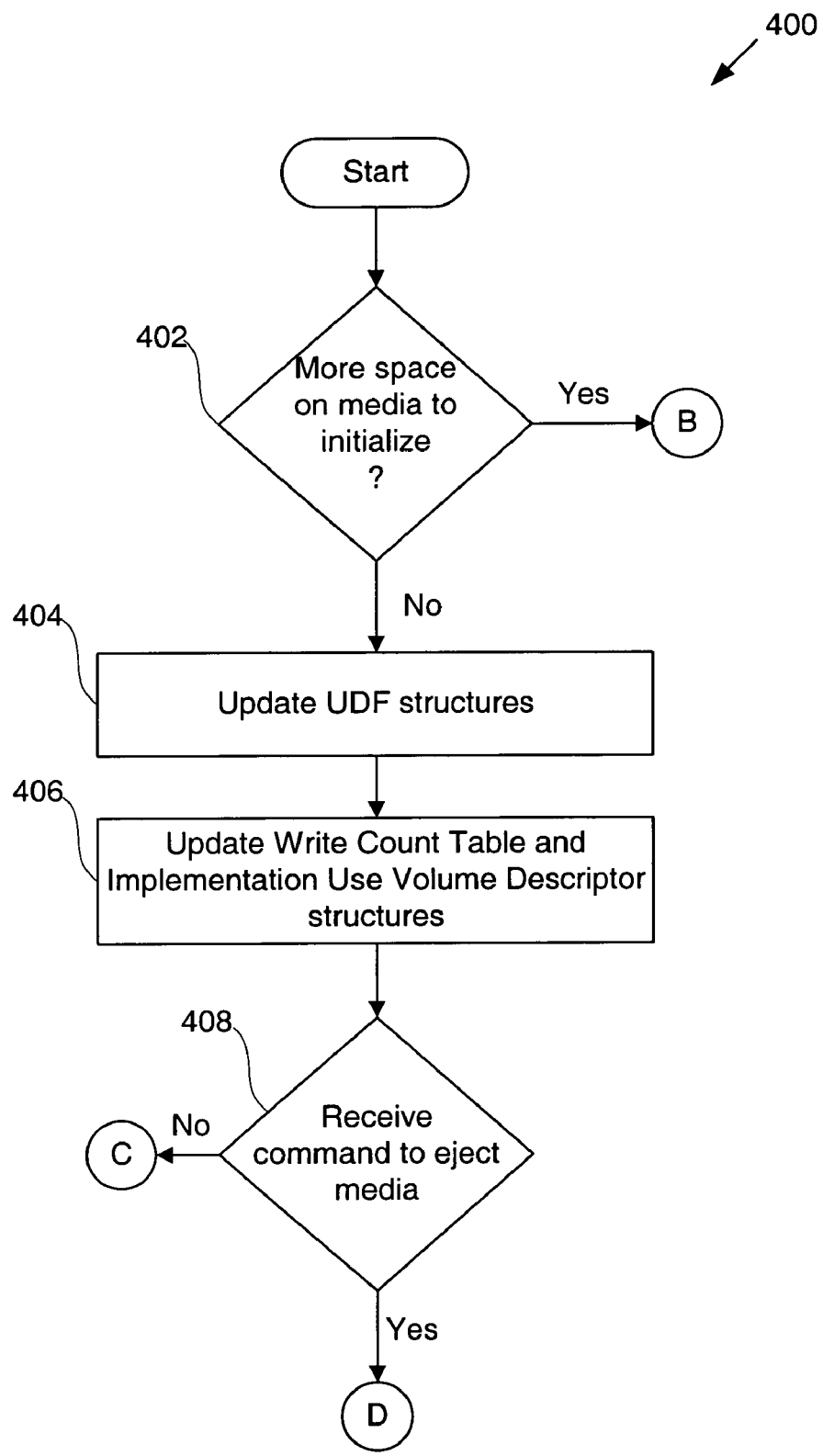
FIG. 9 shows a flow chart diagram illustrating the method operations performed when the RW media is completely initialized in accordance with one embodiment of the invention.

FIG. 9 shows a flow chart diagram 400 illustrating the method operations performed when the RW media is completely initialized in accordance with one embodiment of the invention. The method begins with decision block 402 and determining if there is more media space to initialize. If there is remaining space on the media to be initialized, a "yes" to decision block 402, the method proceeds through connector "B" to continue the background initialization of operation 358 in flow chart diagram 350 of FIG. 7. Once the media has been completely initialized, a "no" to decision block 402 in flow chart diagram 400, the method advances to operation 404.

In operation 404, the UDF structures are updated to reflect the fully initialized optical media. The UDF structures updated in operation 404 will identify the entire media space in essentially any implementation. The updating of the UDF structures, however, does not close the session or track, but does update those file system structures that are used by systems to find and identify space on the media for particular files that are available for writing data, and the like.

Once the UDF structures are updated, the method advances to operation 406 in which the WCT and the IUVD structures are updated. In one embodiment of the invention, the WCT tracks the number of times to which each packet on the optical media is written. Once all of the media space has been initialized, and therefore verified, the WCT and the IUVD are updated to enable tracking of each packet on the optical media.

In one embodiment of the present invention, the session and track of the optical media that has just completed initialization as a background process, is not closed until the command to eject the media is received. In this manner, a user can be prompted of the additional time required to close the session and track, and can acknowledge understanding the additional time required before the media is ejected from the drive. If a user fails to acknowledge the prompt, or if power is interrupted, the UDF and other structures are already updated to identify the entire media space, and so closing of the track and session is not essential for most applications. Further, by issuing a prompt that must be acknowledged, the likelihood of corrupting the media by, for example, securing power to the system during the process of closing the session and track is significantly reduced. If, on the other hand, power is secured or the media is otherwise ejected prior to closing the session and track, the UDF and other structures have been updated to identify the entire media space, and the media would appear similar to media that is only partially initialized, requiring only the closing of the track and session to complete the process.

The method proceeds with decision block 408 in which it is determined which action to take, or which process to follow, based on whether or not the command to eject is received. If the command to eject is not received, a "no" to decision block 408, the method proceeds through connector "C" to simple interaction with the media as discussed in reference to operation 356 of flowchart 350. If the command to eject the media is received in decision block 408, the method proceeds through connector "D" to flowchart 450.

Figure 10:
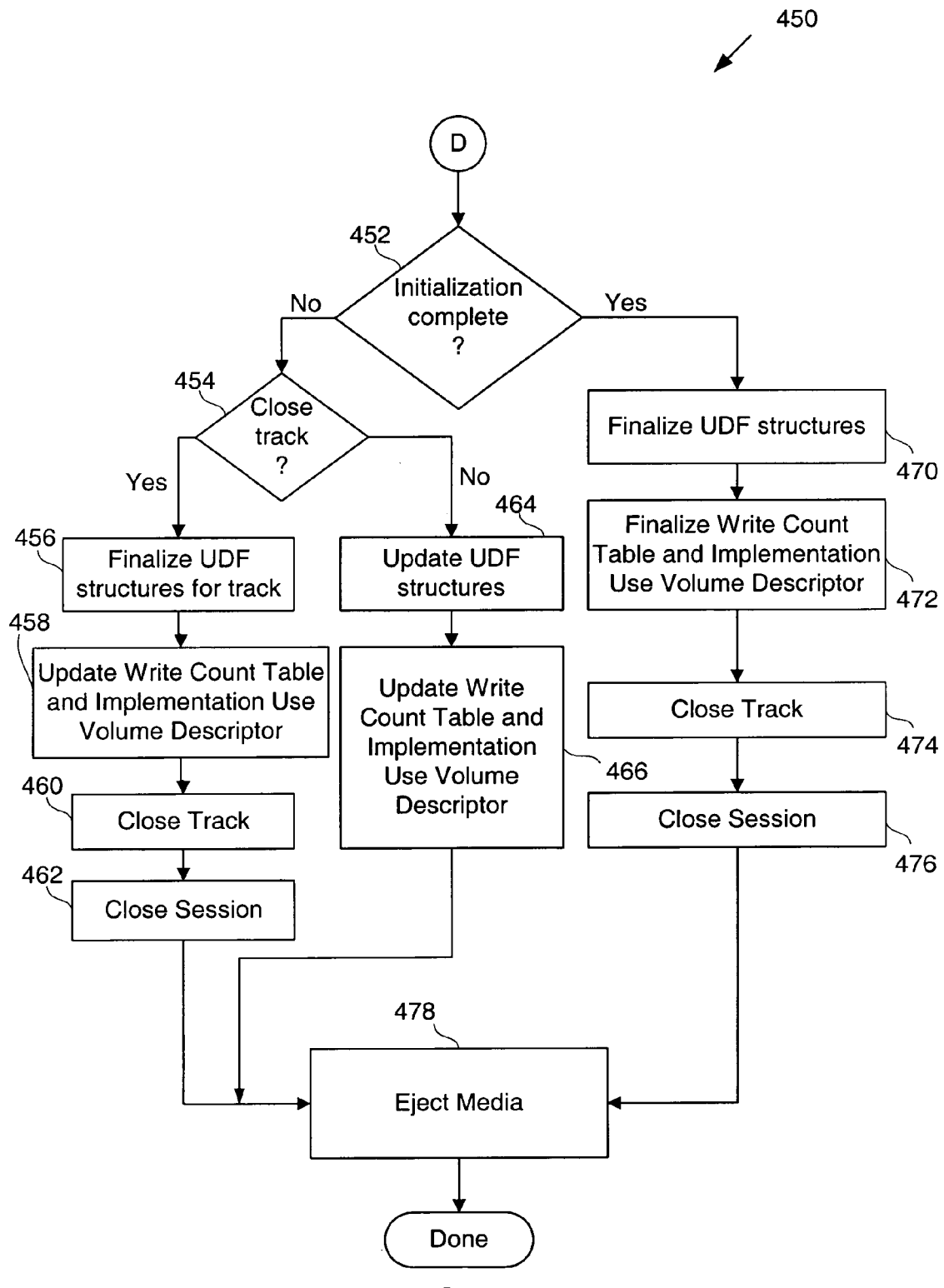
FIG. 10 shows a flow chart diagram illustrating the method operations performed when a command to eject the RW media is received in accordance with one embodiment of the invention.

FIG. 10 shows a flow chart diagram 450 illustrating the method operations performed when a command to eject the RW media is received in accordance with one embodiment of the invention. During, or just after completion of the initialization process, the media is generally in one of two states when a command to eject the media is received. Either the media has been completely initialized, or the initialization of the media is proceeding.

If the initialization of the media is not complete, a "no" to decision block 452, the method proceeds to decision block 454 in which a user is queried whether to close the track and session. If the track is to be closed, a "yes" to decision block 454, the method proceeds with operation 456 in which the UDF structures are finalized for the track. In one embodiment, the UDF structures are finalized to define the initialized media space in the track to be closed. As already described in reference to flow chart 400, when the initialization process completes initialization of the entire media space, the UDF structures and the WCT and IUVD structures are updated to reflect the fully initialized media space. Similarly, the track will be a fully initialized, closed media space, but the entire media space, including that portion outside of the closed track will not be fully initialized. The UDF structures defining the closed track are finalized in operation 456.

The method proceeds with operation 458 in which the inventive structures including the WCT and IUVD are updated to define the initialized closed track media space in addition to the uninitialized media space that remains outside of the closed track. The method then advances to operation 460 in which the track is closed, and then to operation 462 in which the session is closed. As discussed previously in reference to FIGS. 3A and 3B, the closed session has a lead-in block as shown by block 142 of FIG. 3A, and the closed session has a lead-out block as shown by block 150 of FIG. 3A. One embodiment of the present invention writes these and other file system blocks to close the session in operation 462. Once the track and session are closed, the method advances to operation 478 to eject the media, and the method is done.

Returning to decision block 454, if the track and session are not to be closed, a "no" to decision block 454, the method advances to operation 464 in which the UDF structures are updated, and then to operation 466 in which the WCT and the IUVD are updated. These operations are essentially identical to the method operations 404 and 406 discussed in reference to FIG. 9. The updating of the UDF structures and of the WCT and the IUVD is to reflect the current state of initialization, and when the initialization is not complete, the UDF identifies those packets of media space that have been initialized as available media space. The WCT and IUVD are updated to reflect the space that has been initialized as well as the remaining space on the media that still must be initialized. Once the UDF structures and the WCT and IUVD structures have been updated, the method advances to operation 478 in which the optical media is ejected and the method is done.

If the initialization is complete when the command to eject the media is received, a "yes" to decision block 452, the method advances to operation 470 in which the UDF structures are finalized. As already described in reference to flow chart 400, when the initialization process completes initialization of the entire media space, the UDF structures and the WCT and IUVD structures are updated to reflect the fully initialized media space. In one embodiment of the invention, the track and session, however, remain open until sufficient time is acknowledged to finalize the structures and close the track and session. In operation 470, therefore, the updated UDF structures are verified to contain the correct information for the media space, and then finalized in preparation for closing the track and session. Once the UDF structures are finalized, the method advances to operation 472 and performs a similar finalization of the WCT and IUVD.

Once the UDF structures and the WCT and IUVD are finalized, the method advances to operation 474 in which the track is closed, and then to operation 476 in which the session is closed. Once the track and session are closed, the method advances to operation 478 to eject the media, and the method is done.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, DVD-ROM, DVD-R/RW, DVD-RAM, DVD+R/+RW, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A software driven method for formatting a re-writable optical media (RW media), the method comprising:
   receiving a request to format the RW media;
   writing an ISO9660 image to the RW media, the ISO9660 image containing a Universal Disk Format reader;
   writing Universal Disk Format structures to the RW media;
   writing a write count table to the RW media, the write count table being configured to indicate a verification status of packets defined on the RW media;
   writing additional media file system structures to the RW media;
   verifying the ISO9660 image, the Universal Disk Format structures, the write count table, and the additional media file system structures;
   initializing a data partition for the RW media, the data partition being a series of blocks for user data and the initialization including the writing and verifying of initialization packets to the data partition, the initialization proceeding as a background process while the RW media is available for user interaction; and
   enabling interruption of the initializing, the interruption including closing a track and session on the RW media.

2. The software driven method for formatting an RW media as recited in claim 1, further comprising:
   opening a previously closed session on the RW media;
   calculating a length for an alignment track;
   writing an alignment track;
   opening a new fixed packet track; and
   resuming the initializing of the RW media in the new fixed packet track.

3. The software driven method for formatting an RW media as recited in claim 1, wherein the Universal Disk Format structures include an anchor volume descriptor pointer, a primary volume descriptor sequence, a reserved volume descriptor sequence, a logical volume integrity descriptor, and a spare table.

4. The software driven method for formatting an RW media as recited in claim 1, wherein the additional media file system structures include, an unallocated space bitmap, a file set descriptor, and a root directory for a partition to the RW media.

5. The software driven method for formatting an RW media as recited in claim 1, wherein the verifying the ISO9660 image, the Universal Disk Format structures, the write count table, and the additional media file system structures includes the repairing of any errors if errors are found and if errors are repairable.

6. The software driven method for formatting an RW media as recited in claim 1, further comprising:
   writing an implementation use volume descriptor to the RW media, the implementation use volume descriptor being configured to identify a location and a size of the write count table.

7. The software driven method for formatting an RW media as recited in claim 6, wherein the software driven method for a single RW media requires from about two minutes to about four minutes to complete the software driven method.

8. The software driven method for formatting an RW media as recited in claim 2, wherein the calculating the length for the alignment track includes determining the length of the alignment track to ensure the new fixed packet track begins at a logical address that is an integral multiple of a packet size.

9. The software driven method for formatting an RW media as recited in claim 2, wherein the initialization packets include one of user data and initialization patterns.

10. A software driven method for initializing a re-writable optical media (RW media), the method comprising:
    code for formatting the RW media;
    code for writing initialization packets to the RW media;
    code for verifying the initialization packets, wherein the writing and verifying of initialization packets is processed as a background operation while allowing a user to interact with the RW media; and
    code for interrupting the writing and verifying and for closing a session on the media, the closed session enabling the RW media to be compatible for use in an optical media device requiring the closed session to interact with the RW media, the method further including,
    code for opening the closed session;
    code for calculating a length for an alignment track;
    code for writing the alignment track;
    code for opening a new fixed packet track on the RW media; and
    code for resuming the writing and verifying of initialization packets in the new fixed packet track on the RW media.

11. The software driven method for initializing an RW media as recited in claim 10, wherein user data is used for the writing of initialization packets.

12. The software driven method for initializing an RW media as recited in claim 10, wherein initialization patterns are used for the writing of initialization packets.

13. The software driven method for initializing an RW media as recited in claim 10, wherein the calculating the length for the alignment track includes determining the length for the alignment to ensure the new fixed packet track begins at a logical address that is an integral multiple of a packet size.

14. The software driven method for initializing an RW media as recited in claim 10, wherein the code for formatting the RW media includes,
    code for writing an ISO9660 image to the RW media, the ISO9660 image containing a Universal Disk Format reader;
    code for writing Universal Disk Format structures to the RW media;
    code for writing a write count table to the RW media, the write count table being configured to store a counter corresponding to each packet defined on the RW media;
    code for writing additional media file system structures; and
    code for verifying the ISO9660 image, the Universal Disk Format structures, the write count table, and the additional media file system structures.

15. The software driven method for initializing an RW media as recited in claim 14, wherein Universal Disk Format structures are updated to define initialized RW media space.

16. The software driven method for initializing an RW media as recited in claim 14, wherein the additional media file system structures include, an unallocated space bitmap, a file set descriptor, and a root directory for a partition to the RW media.

17. The software driven method for initializing an RW media as recited in claim 16, wherein the unallocated space bitmap identifies only initialized areas of the RW media.

18. A method for initialization of a multi-track re-writable optical media (RW media), comprising:
  formatting the RW media;
  initializing the RW media, the initializing including writing and verifying a packet for user data to the RW media;
  closing a session on the RW media;
  opening the session on the RW media;
  calculating a length of an alignment track;
  writing the alignment track;
  opening a new fixed packet track on the RW media; and
  resuming the initializing of the RW media in the new fixed packet track.

19. The method for initialization of a multi-track RW media of claim 18, wherein the calculating the length of the alignment track includes ensuring the new fixed packet track begins with a logical address that is an integral multiple of a packet size.

* * * * *